(12) United States Patent
Dowers, II et al.

(10) Patent No.: US 8,806,281 B1
(45) Date of Patent: Aug. 12, 2014

(54) SYSTEMS AND METHODS FOR DISPLAYING BACKUP-STATUS INFORMATION FOR COMPUTING RESOURCES

(75) Inventors: Gregory R. Dowers, II, Lake Mary, FL (US); Thomas Weaver, Orlando, FL (US); Jessica Rich, Santee, CA (US); Robert Santiago, Oviedo, FL (US)

(73) Assignee: Symantec Corporation, Mountain View, CA (US)

( * ) Notice: Subject to any disclaimer, the term of this patent is extended or adjusted under 35 U.S.C. 154(b) by 296 days.

(21) Appl. No.: 13/356,114

(22) Filed: Jan. 23, 2012

(51) Int. Cl.
*G06F 11/00* (2006.01)
(52) U.S. Cl.
USPC .............................. 714/57; 714/46
(58) Field of Classification Search
USPC ................ 714/1, 46, 47.1, 57; 711/162
See application file for complete search history.

(56) References Cited

U.S. PATENT DOCUMENTS

| | | | |
|---|---|---|---|
| 6,687,846 B1 * | 2/2004 | Adrangi et al. | 714/4.4 |
| 7,274,375 B1 * | 9/2007 | David | 345/619 |
| 7,523,408 B2 * | 4/2009 | Barrios et al. | 715/772 |
| 7,546,323 B1 * | 6/2009 | Timmins et al. | 1/1 |
| 7,937,546 B2 | 5/2011 | Hiraiwa et al. | |
| 8,230,019 B2 * | 7/2012 | Keohane et al. | 709/206 |
| 8,412,680 B1 * | 4/2013 | Gokhale et al. | 707/654 |
| 2005/0005194 A1 * | 1/2005 | Scanlan et al. | 714/13 |
| 2005/0015662 A1 * | 1/2005 | Scanlan | 714/13 |
| 2007/0055918 A1 * | 3/2007 | Snover et al. | 714/57 |
| 2010/0115348 A1 * | 5/2010 | Gilluwe | 714/57 |
| 2011/0041004 A1 | 2/2011 | Miwa et al. | |
| 2011/0137865 A1 * | 6/2011 | Shin et al. | 707/648 |
| 2012/0011408 A1 * | 1/2012 | Swamy et al. | 714/57 |
| 2012/0117346 A1 * | 5/2012 | Stocklein et al. | 711/162 |
| 2012/0120078 A1 * | 5/2012 | Hubbard | 345/440.2 |

OTHER PUBLICATIONS

Barker, Shawn; Microsoft Active Directory Backup and Recovery in Windows Server 2008; 2007; Quest Software, Inc.
Kirk Hartmann Freiheit, et al.; Systems and Methods for Providing Backup Interfaces; U.S. Appl. No. 13/314,517, filed Dec. 8, 2011.
Gregory R. Dowers, II, et al.; Systems and Methods for Navigating Backup Configurations; U.S. Appl. No. 13/314,538, filed Dec. 8, 2011.
Theodore J. Kaiser, IV, et al.; Systems and Methods for Providing Backup Storage Interfaces; U.S. Appl. No. 13/314,557, filed Dec. 8, 2011.
Thomas Weaver, et al; Systems and Methods for Simultaneously Configuring Multiple Independent Backups; U.S. Appl. No. 13/358,245, filed Jan. 25, 2012.

* cited by examiner

*Primary Examiner* — Marc Duncan
(74) *Attorney, Agent, or Firm* — ALG Intellectual Property, LLC

(57) ABSTRACT

A method for displaying backup-status information for computing resources. The method may include (1) identifying at least one protected resource that is scheduled to be backed up periodically, (2) identifying a request to view backup-status information for the protected resource, (3) in response to the request, identifying each backup of the protected resource that was scheduled to occur during a prior window of time, (4) determining whether each scheduled backup of the protected resource was successful, and (5) displaying, within a graphical user interface, a visual backup status indicator for the protected resource for the prior window of time, wherein the visual backup status indicator visually indicates whether any scheduled backups of the protected resource failed during the prior window of time. Various other methods, systems, and computer-readable media are also disclosed.

20 Claims, 8 Drawing Sheets

FIG. 4

Backup Central Administration Server

Backup ▷ | Add Server | Remove Server | Groups

Resource List 410

Servers

| Server | Status | Last 7 Days (Sa Su Mo Tu We Th Fr) | Last Backup | Backup Status |
|---|---|---|---|---|
| Symcdemovm1.local | Backed up with exceptions | ✓ ✓ ✓ ✗ ✓ ✓ ! | 12/2/2011 3:01:54 AM | Backup Status 432 |
| symcdemovm2.local | Backed up | ✗ ✓ ✗ ✓ ✓ ✓ ✓ | 12/2/2011 3:01:05 AM | Backup Status 434 |
| symcdemovm3.local | Never backed up | | | Backup Status 436 |
| symcdemovm4 | Backed up | ✓ ✓ ✗ ✓ ✓ ✓ ✓ | 12/2/2011 3:00:04 AM | Backup Status 438 |
| symcdemovm5 | Backed up | ✓ ✗ ✗ ✓ ✓ ✓ ✓ | 12/2/2011 4:18:39 AM | Backup Status 440 |
| symcdemovm6 | Backed up | ✓ ✗ ✗ ! ✓ ✓ ✓ | 12/2/2011 3:00:28 AM | Backup Status 442 |

Resource 412, Resource 414, Resource 416, Resource 418, Resource 420, Resource 422

SYSTEMS AND METHODS FOR DISPLAYING BACKUP-STATUS INFORMATION FOR COMPUTING RESOURCES

BACKGROUND

In the digital age, organizations increasingly rely on digitally-stored data. To protect against data loss, an organization may use one or more backup systems to back up important data.

Due to increasingly complex information technology infrastructures, an organization may create backups for a variety of computing resources, using a variety of methods, and according to a variety of different schedules. Accordingly, an administrator may face a proliferation of backups to monitor and manage. In an attempt to facilitate the monitoring of backups, traditional backup administration systems may allow an administrator to view a list of individual backups that have recently run and information that indicates a status (e.g., successful or unsuccessful) for each individual backup in the list.

Unfortunately, monitoring backups using traditional backup administration systems may cost a significant amount of time and effort on the part of an administrator because a backup environment may include many computing resources that are continually backed up, and each of these computing resources may have multiple backups. To make sure that each computing resource within the backup environment is being properly backed up, an administrator may need to sift through a significant amount of data. For example, to make sure that a single computing resource within the backup environment is being properly backed up, an administrator may need to (1) sift through backup-status information for every backup of every computing resource within the backup environment, (2) identify all backups of the computing resource, and (3) determine that all backups of the computing resource were successful. Accordingly, the instant disclosure addresses a need for additional and improved systems and methods for displaying backup-status information for computing resources.

SUMMARY

As will be described in greater detail below, the instant disclosure generally relates to systems and methods for displaying visual backup-status indicators that allow a user to quickly determine if recent backups of computing resources have succeeded or failed without having to individually identify and analyze the status of each backup. In one example, a computer-implemented method for performing such a task may include (1) identifying at least one protected resource that is scheduled to be backed up periodically, (2) identifying a request to view backup-status information for the protected resource, (3) in response to the request, identifying each backup of the protected resource that was scheduled to occur during a prior window of time, (4) determining whether each scheduled backup of the protected resource was successful, and (5) displaying, within a graphical user interface, a visual backup status indicator for the protected resource for the prior window of time that visually indicates whether any scheduled backups of the protected resource failed during the prior window of time.

In some embodiments, the visual backup status indicator for the protected resource for the prior window of time may visually indicate whether any scheduled backups of the protected resource failed during the prior window of time without displaying an individual backup status for each backup of the protected resource that was scheduled to occur during the prior window of time.

In certain embodiments, the visual backup status indicator may visually indicate (1) that each scheduled backup of the protected resource was successful, (2) that at least one scheduled backup of the protected resource failed, (3) that at least one scheduled backup of the protected resource succeeded with exceptions, and/or (4) that there was no backup scheduled to occur during the prior window of time.

In one embodiment, the visual backup status indicator for the protected resource may visually indicate whether any scheduled backups of the protected resource failed during the prior window of time using at least one color and/or at least one symbol.

In another embodiment, the prior window of time may include a plurality of time periods. In this embodiment, the step of identifying each backup of the protected resource that was scheduled to occur during the prior window of time may include identifying each backup of the protected resource that was scheduled to occur during each of the plurality of time periods, and the step of displaying the visual backup status indicator for the protected resource for the prior window of time may include displaying, within the graphical user interface, a visual backup status indicator for the protected resource for each of the plurality of time periods.

In some embodiments, the plurality of time periods may include two or more consecutive time periods, and the two or more consecutive time periods may include a current time period. In other embodiments, the method may include allowing a user to access additional backup-status information of the protected resource for the prior window of time via the graphical user interface.

In certain embodiments, the additional backup-status information may include an individual backup status for at least one scheduled backup of the protected resource that identifies whether the scheduled backup of the protected resource was successful and/or a backup log for the scheduled backup of the protected resource that provides a description of the scheduled backup of the protected resource. In some embodiments, the method may further include allowing a user to restart at least one scheduled backup of the protected resource via the graphical user interface.

In at least one embodiment, the step of displaying the visual backup status indicator for the protected resource for the prior window of time may include displaying, within the graphical user interface, a list of protected resources that includes the protected resource and then displaying, within the list of protected resources, the visual backup status indicator for the protected resource for the prior window of time. In various embodiments, the protected resource may include a server or an application.

In one embodiment, a system for implementing the above-described method may include an identification module programmed to (1) identify at least one protected resource that is scheduled to be backed up periodically and (2) identify a request to view backup-status information for the protected resource. The system may also include a determination module programmed to, in response to the request, (1) identify each backup of the protected resource that was scheduled to occur during a prior window of time and (2) determine whether each scheduled backup of the protected resource was successful. The system may further include an interface module programmed to display, within a graphical user interface, a visual backup status indicator for the protected resource for the prior window of time that indicates whether any scheduled backups of the protected resource failed during the prior window of time. Additionally, the system may include at least one processor configured to execute the identification module, the determination module and the interface module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify at least one protected resource that is scheduled to be backed up periodically, (2) identify a request to view backup-status information for the protected resource, (3) in response to the request, identify each backup of the protected resource that was scheduled to occur during a prior window of time, (4) determine whether each scheduled backup of the protected resource was successful, and (5) display, within a graphical user interface, a visual backup status indicator for the protected resource for the prior window of time that visually indicates whether any scheduled backups of the protected resource failed during the prior window of time.

As will be explained in greater detail below, by displaying visual backup status indicators within a graphical user interface, the systems and methods described herein may allow a user to quickly determine if backups of computing resources have succeeded or failed during a recent period of time without the need to sift through individual backup statuses. Furthermore, in some examples, by providing additional backup-status information, these systems and methods may also allow a user to easily access information needed to troubleshoot backup failures.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a diagram of an exemplary graphical user interface for displaying backup-status information for computing resources.

Figure 1:
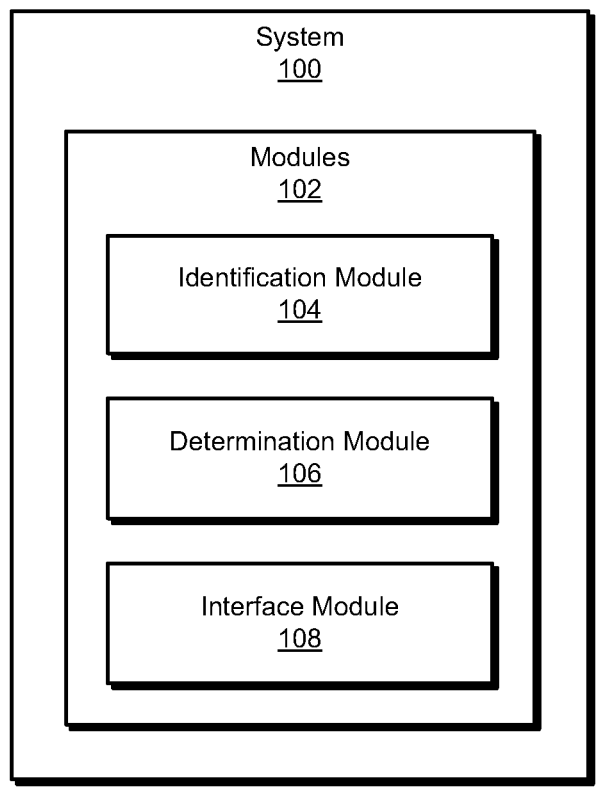
FIG. 1 is a block diagram of an exemplary system for displaying backup-status information for computing resources.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
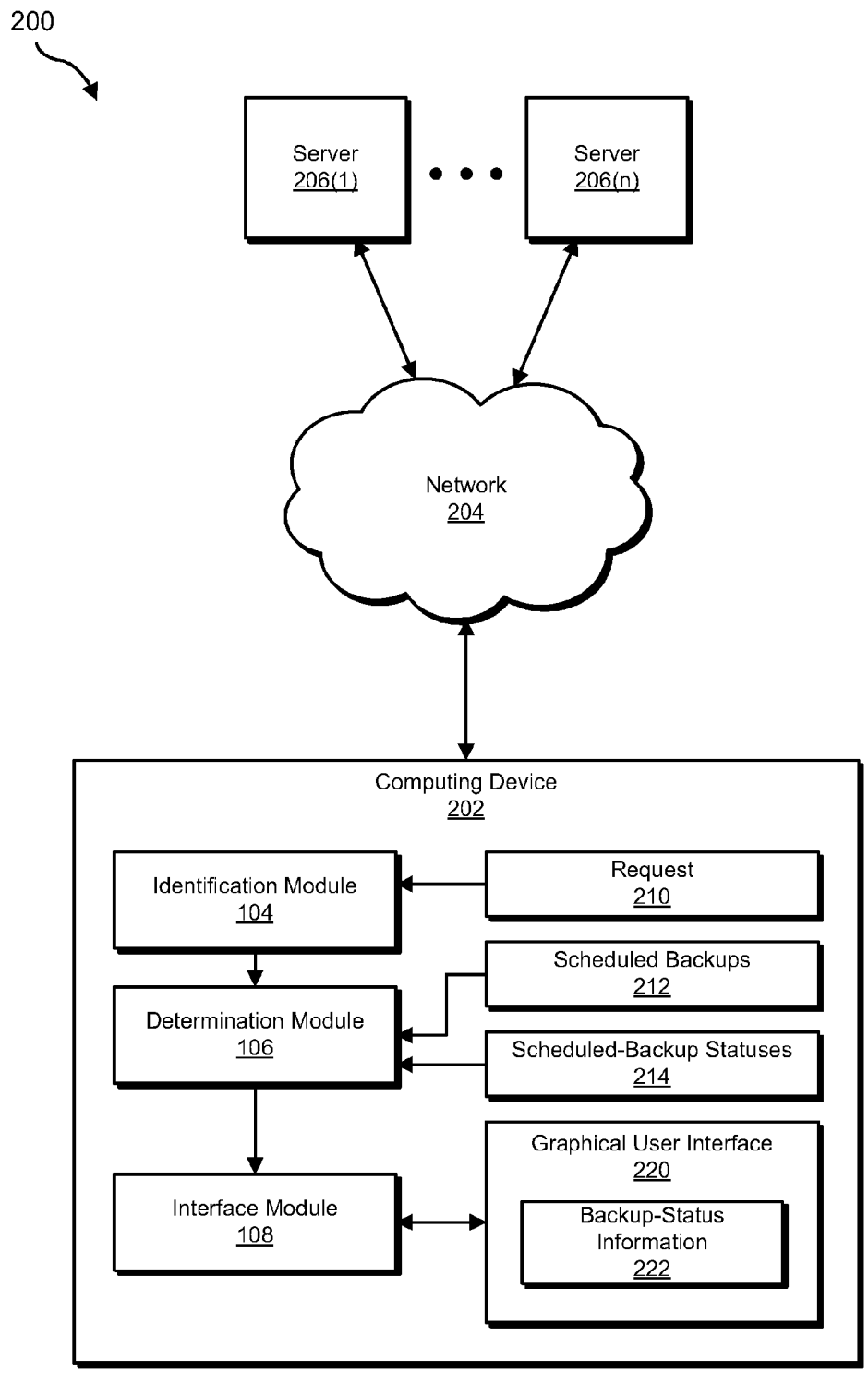
FIG. 2 is a block diagram of an exemplary system for displaying backup-status information for computing resources.

The following will provide, with reference to FIGS. 1-2, detailed descriptions of exemplary systems for displaying backup-status information for computing resources. Detailed descriptions of corresponding computer-implemented methods will also be provided in connection with FIG. 3. In addition, detailed descriptions of exemplary graphical user interfaces will be provided in connection with FIGS. 4-6. Furthermore, detailed descriptions of an exemplary computing system and network architecture capable of implementing one or more of the embodiments described herein will be provided in connection with FIGS. 7 and 8, respectively.

FIG. 1 is a block diagram of an exemplary system 100 for displaying backup-status information for computing resources. As illustrated in this figure, exemplary system 100 may include one or more modules 102 for performing one or more tasks. For example, and as will be explained in greater detail below, exemplary system 100 may include an identification module 104 programmed to (1) identify at least one protected resource that is scheduled to be backed up periodically and (2) identify a request to view backup-status information for the protected resource. Exemplary system 100 may also include a determination module 106 programmed to (1) identify, in response to the request, each backup of the protected resource that was scheduled to occur during a prior window of time and (2) determine whether each scheduled backup of the protected resource was successful.

In addition, and as will be described in greater detail below, exemplary system 100 may include an interface module 108 programmed to display, within a graphical user interface, a visual backup status indicator for the protected resource for the prior window of time that visually indicates whether any scheduled backups of the protected resource failed during the prior window of time. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or servers 206(1)-(n)), computing system 710 in FIG. 7, and/or portions of exemplary network architecture 800 in FIG. 8. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with servers 206(1)-(n) via a network 204.

In one embodiment, one or more of modules 102 from FIG. 1 may, when executed by at least one processor of computing device 202, enable computing device 202 to display backup-status information for computing resources within exemplary system 200. For example, and as will be described in greater detail below, one or more of modules 102 may cause computing device 202 to (1) identify at least one protected resource (e.g., at least one of servers 206(1)-(n)) that is scheduled to be backed up periodically, (2) identify request 210, which may be a request to view backup-status information for the protected resource, (3) in response to the request, identify each backup of the protected resource that was scheduled to occur during a prior window of time (e.g., by querying scheduled backups 212), (4) determine whether each scheduled backup of the protected resource was successful (e.g., by querying scheduled-backup statuses 214), and (5) display, within graphical user interface 220, a visual backup status indicator for the protected resource for the prior window of time that visually indicates whether any scheduled backups of the protected resource failed during the prior window of time.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 710 in FIG. 7, or any other suitable computing device. In at least one example, system 200 may represent a backup environment and computing device 202 may represent a backup central administration server that is used to monitor and manage backups of servers 206(1)-(n). As used herein, the term "backup environment" may generally refer to any collection of computing resources (e.g., within an enterprise, an information technology infrastructure, etc.) subject to backup management via a backup system.

Servers 206(1)-(n) generally represents any type or form of computing device that is capable of storing, managing and/or processing data. Examples of servers 206(1)-(n) include, without limitation, application servers and database servers configured to provide various database services and/or run certain software applications. In at least one example, servers 206(1)-(n) may represent computing resources that may be backed up periodically by a backup system.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between computing device 202 and servers 206(1)-(n).

Figure 3:
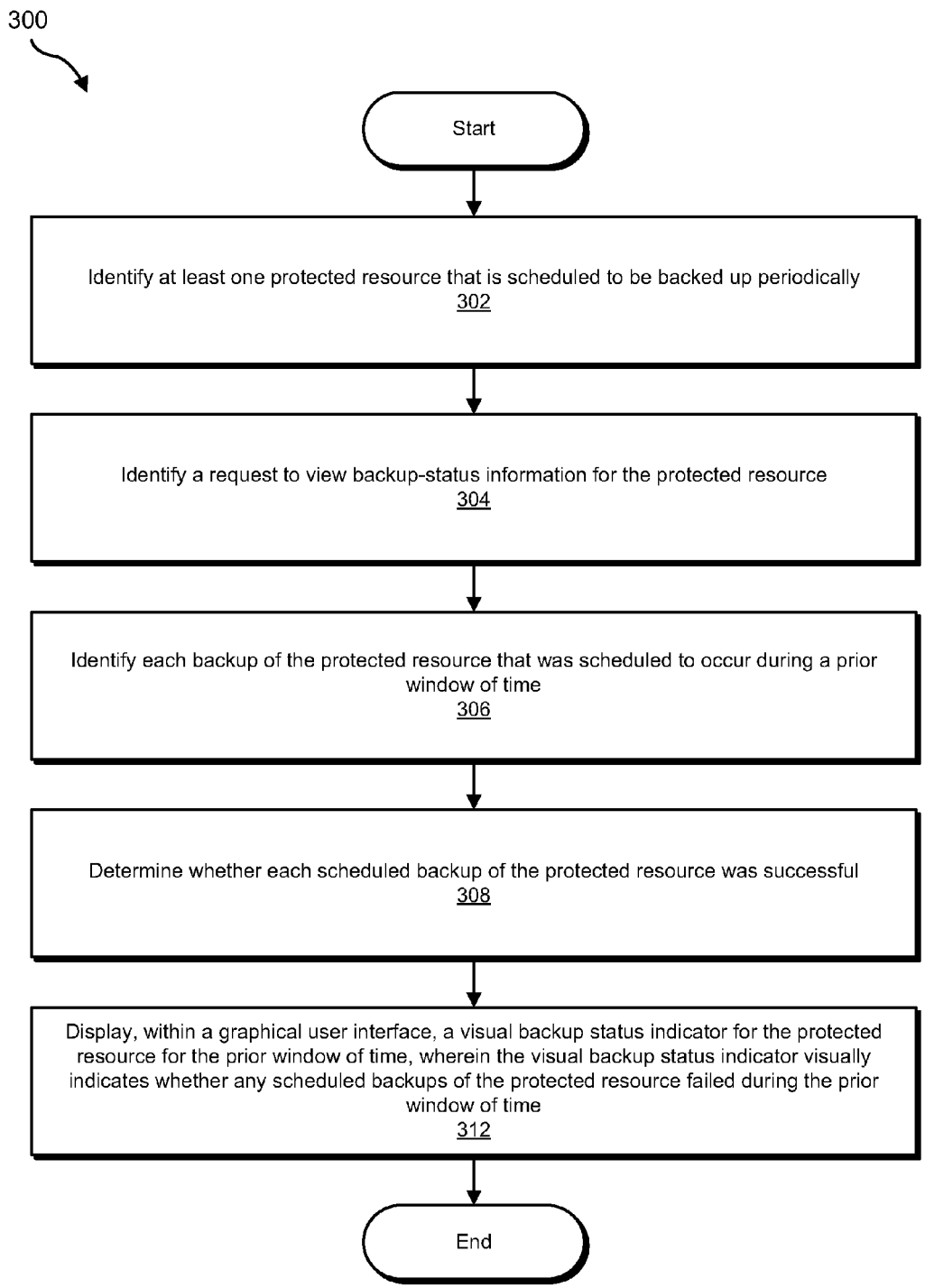
FIG. 3 is a flow diagram of an exemplary method for displaying backup-status information for computing resources.

FIG. 3 is a flow diagram of an exemplary computer-implemented method 300 for displaying backup-status information for computing resources. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

At step 302, one or more of the systems described herein may identify at least one protected resource that is scheduled to be backed up periodically. For example, at step 302 identification module 104 may, as part of computing device 202 in FIG. 2, identify at least one of servers 206(1)-(n).

As used herein, the term "protected resource" may generally refer to any computing resource that includes or uses data, any computing resource for which data is backed up in a backup operation, and/or any other computing resource within a backup environment. For example, a protected resource may include a computing device, a storage device, a server (e.g., a database server or an application server) and/or an application (e.g., a database application or an email server application).

In addition, the term "backup operation," as used herein, may include any operation for backing up, protecting, transferring, and/or replicating data. Examples of backup operations include, without limitation, backing up data (e.g., to a disk, a tape, a deduplication data store, etc.), duplicating data (e.g., to a disk, a tape, etc.), archiving data, migrating data, creating a virtual copy of a resource, etc.

Identification module 104 may identify the protected resource in any suitable manner. For example, identification module 104 may identify the protected resource by identifying one or more computing resources within a backup environment that are managed by a backup system. Additionally or alternatively, identification module 104 may identify the protected resources in response to receiving a request to view information about the protected resource (e.g., in response to a request identified as part step 304).

At step 304, one or more of the systems described herein may identify a request to view backup-status information for the protected resource. For example at step 304, identification module 104 may, as part of computing device 202 of FIG. 2, identify request 210.

As used herein, the term "backup-status information" may generally refer to information relating to and/or summarizing a backup status of one or more completed or attempted backups of a protected resource. For example, backup-status information may include a backup status indicator, a backup status of an individual backup, a backup status of a protected resource, and/or backup log information.

In addition, the term "backup status," as used herein, may generally refer to information that indicates a state, condition, or outcome of one or more backups of a protected resource. In one example, a backup status for a protected resource may indicate whether any scheduled backups of the protected resource have failed. For example, a backup status may indicate that each scheduled backup of the protected resource was successful, that at least one scheduled backup of the protected resource failed, that at least one scheduled backup of the protected resource succeeded with exceptions, and/or that there was no backup scheduled to occur during the prior window of time. In another example, a backup status for an individual backup may indicate whether the individual backup failed.

Identification module 104 may identify the request to view backup-status information for the protected resource in a variety of ways. For example, identification module 104 may identify the request as part of identifying the protected resource. In some examples, identification module 104 may identify the request when a backup administration program is loaded. Additionally or alternatively, identification module 104 may identify the request when an option within a backup administration program is selected and/or a module within the backup administration program is loaded.

At step 306, one or more of the systems described herein may identify, in response to the request, each backup of the protected resource that was scheduled to occur during a prior window of time. For example at step 306, identification module 104 may, as part of computing device 202 in FIG. 2, identify each backup of server 206(1) that was scheduled to occur during a prior window of time (e.g., by querying scheduled backups 212).

As used herein, the term "backup" may generally refer to any performance, attempted performance, or scheduled performance of one or more backup operations on a protected resource. In some examples, a protected resource may have one or more backups associated with the protected resource. In general, a protected resource may have one or more backups associated with it. In one example, a protected resource may have one or more backup operations performed periodically on the protected resource. For example, a protected resource may be backed up to a disk daily. In this example, the protected resource would have a backup for every day.

As used herein, the term "prior window of time" may generally refer to any time period of any length where knowing the backup-status of a protected resource over such time period would be helpful to a user. For example, if backups are performed daily, a prior window of time may include one or more days. In another example, if backups are performed hourly, a prior window of time may include one or more hours. In one example, the length of the prior window of time may be predetermined.

In some examples, the prior window of time may include a plurality of time periods. For example, a prior window of time that is one week long may include seven days. In one example, the plurality of time periods may include two or more consecutive time periods, and the two or more consecutive time periods include a current time period. For example, a prior window of time that is one week long may include seven consecutive days and may include the current day of the week. In this example, the prior window of time may change (or roll forward) once a day to always include the current day.

Identification module 104 may identify each backup of the protected resource that was scheduled to occur during a prior window of time in any suitable manner. For example, identification module 104 may identify each time a backup of the protected resource was completed, scheduled and/or attempted during the prior window of time.

As mentioned above, in some examples, the prior window of time may include a plurality of time periods. In these examples, identification module 104 may identify each backup of the protected resource that was completed, scheduled, and/or attempted during each of the plurality of time periods.

At step 308, one or more of the systems described herein may determine whether each scheduled backup of the protected resource was successful. For example, determination module 106 may determine whether each scheduled backup of server 206(1) was successful.

Determination module 106 may determine whether each scheduled backup of the protected resource was successful in a variety of ways. For example, determination module 106 may determine whether each scheduled backup of the protected resource was successful by querying scheduled-backup statuses 214.

At step 310, one or more of the systems described herein may display, within a graphical user interface, a visual backup status indicator for the protected resource for the prior window of time, wherein the visual backup status indicator visually indicates whether any scheduled backups of the protected resource failed during the prior window of time. For example, interface module 108 may display, within graphical user interface 220, backup-status information 222 for server 206(1) for the prior window of time that visually indicates whether any scheduled backups of server 206(1) failed during the prior window of time.

As used herein, the term "backup status indicator" may generally refer to any helpful summary of the backup status of each scheduled backup of a protected resource. In one example, when a protected resource has a single backup, a backup status indicator for the protected resource may reflect the backup status of the single backup. For example, the backup status for the protected resource may indicate that the backup was successful, failed, and/or succeeded with exceptions. Similarly, when a protected resource has more than one backup, a backup status of the protected resource may reflect the worst backup status among the backups of the protected resource.

In addition, the term "visual backup status indicator," as used herein, generally refers to any visual representation of a backup status. For example, a visual backup status indicator may include, without limitation, a color, a symbol, a word, or a phrase. Similarly, the term "graphical user interface" may generally refer to any interface that may allow a user to interact with a computing system. In some examples, the graphical user interface may include an interface for a backup central administration server.

Interface module 108 may display the visual backup status indicator for the protected resource for the prior window of time in a variety of ways. For example, interface module 108 may display the visual backup status indicator for the protected resource for the prior window of time by displaying, within the graphical user interface, a list of protected resources that includes the protected resource and then displaying, within the list of protected resources, the visual backup status indicator for the protected resource for the prior window of time. For example, interface module 108 may display a backup status for each protected resource within the list of protected resources. By providing a quick visual summary of whether backups have succeeded or failed over a recent period, interface module 108 may allow an administrator to quickly and easily determine the backup status for each of the protected resources within the list of protected resources. An example of a visual backup status indictor displayed within a list of protected resources will be provided below in connection with FIG. 4.

In some examples, interface module 108 may display the visual backup status indicator for the protected resource using at least one color and/or at least one symbol. In one example, interface module 108 may indicate that all backups were successful during the prior window of time by displaying a box with a green background and/or a checkmark icon. Similarly, interface module 108 may indicate that one or more backups failed during the prior window of time by displaying a box with a red background and/or with an "X" icon. Interface module 108 may indicate that at least one backup succeeded with exceptions by displaying a box a yellow background and/or a warning icon (e.g., an "!" icon). Additionally, interface module 108 may indicate that no backups were performed, scheduled, or attempted during the prior window of time by displaying an empty box.

In some embodiments, interface module 108 may display the visual backup status indicator for the protected resource for the prior window of time by displaying, within the graphical user interface, a visual backup status indicator for the protected resource for each of the plurality of time periods.

An example of a visual backup status that includes a backup status for a plurality of time periods will be provided below in connection with FIG. 5.

In addition to displaying a backup-status indicator for the protected resource, interface module 108 may also allow a user to access additional backup-status information via the graphical user interface and/or visual backup status indicator. For example, a user that has determined that a backup for a protect resource has failed may access additional details about a backup of a protected resource for troubleshooting purposes. In some examples, the additional backup-status information may include an individual backup status for at least one scheduled backup of the protected resource that identifies whether the scheduled backup of the protected resource was successful and/or a backup log for the scheduled backup of the protected resource that provides a description of the scheduled backup of the protected resource. In some examples, interface module 108 may also allow a user to restart at least one scheduled backup of the protected resource via the graphical user interface.

Figure 5:
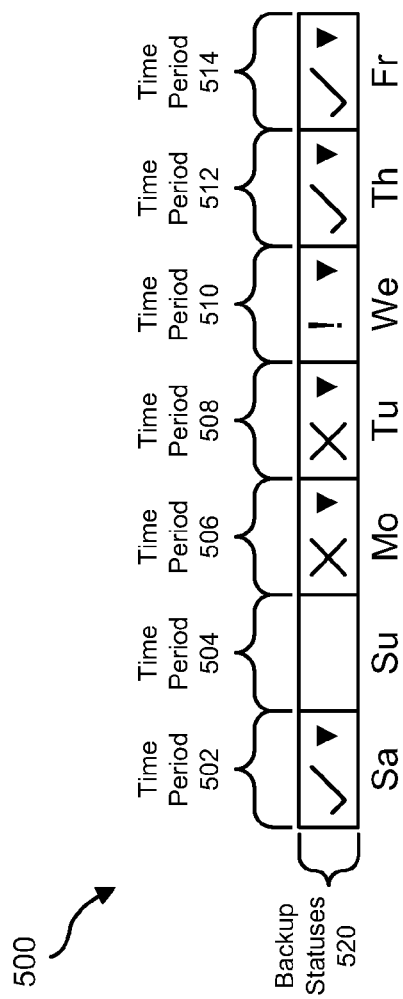
FIG. 5 is a diagram of an exemplary backup-status indicator.
Figure 6:
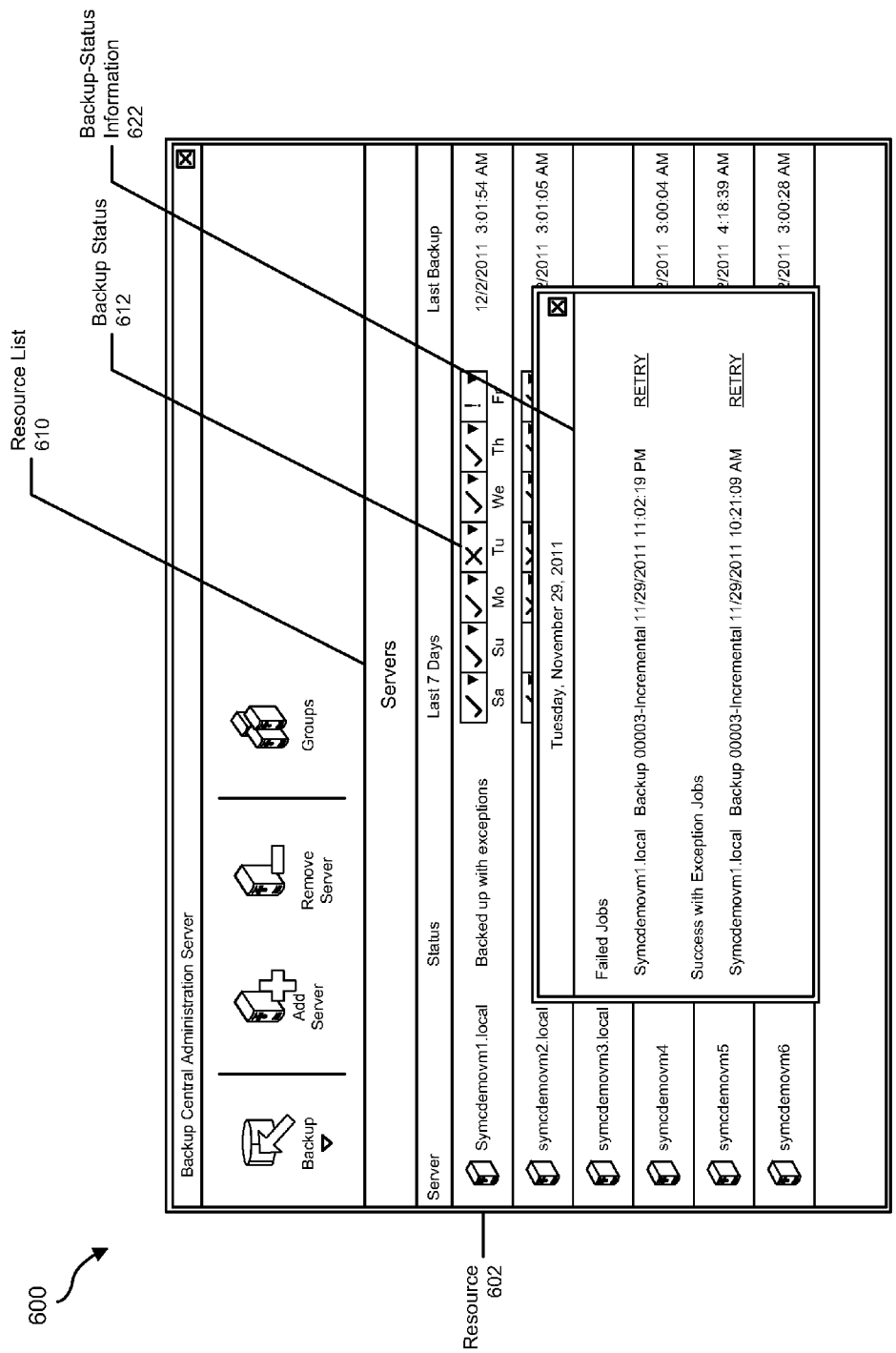
FIG. 6 is a diagram of an exemplary graphical user interface for displaying backup-status information for computing resources.

FIGS. 4-6 illustrate how interface module 108 may display, within a graphical user interface, a visual backup status indicator for computing resources. FIG. 4 is a diagram of an exemplary graphical user interface 400. Exemplary graphical user interface 400 provides an illustration of how interface module 108 may display a visual backup status indicator within a list of protected resources. As shown in FIG. 4, exemplary graphical user interface 400 may include a resource list 410 that includes resources 412-422. In this example, resources 412-422 may represent servers and/or applications being backed up and may have one or more associated backups.

Exemplary graphical user interface 400 may also include backup-statuses 432-442 that visually indicate whether any scheduled backups of resources 412-422 have failed during the prior window of time represented by the backup-statuses 432-442 (in this example a period of seven days). As displayed in exemplary graphical user interface 400 by interface module 108, backup-status indicators 432-442 may allow a user to quickly scan down resource list 410 and to see which of resources 412-422 had backups that were not successful.

FIG. 5 is a diagram of exemplary backup status indicator 500. Backup status indicator 500 provides an illustration of how interface module 108 may display a backup status indicator for a protected resource for a prior period of time that includes a plurality of time periods. As shown in FIG. 5, exemplary backup status indicator 500 may include time periods 502-514 with associated backup statuses 520. In this example, time periods 502-514 represent seven consecutive days. Time period 502 may represent the oldest time period and time period 514 may represent the most-recent time period. In at least one example, time period 514 may represent the current time period. Here each time period is labeled with a backup status 520.

In this example, backup statuses 520 associated with time periods 502, 512, and 514 (e.g., a box with a checkmark) indicate that all backups of the protected resource during time periods 502, 512, and 514 were successful. The backup status associated with time period 504 (e.g., a blank box) indicates that no backups were scheduled for the protected resource during time period 504. The backup statuses 520 associated with time periods 506 and 508 (e.g., a box with an "X" icon) indicate that at least one backup of the protected resource failed during time periods 506 and 508. The backup status associated with time period 510 (e.g., a box with a "!" icon) indicates at least one backup of the protected resource succeeded with exceptions during time period 510.

FIG. 6 is a diagram of an exemplary graphical user interface 600. Exemplary graphical user interface 600 provides an illustration of how interface module 108 may display additional backup-status information of a protected resource within a graphical user interface. As shown in FIG. 6, exemplary graphical user interface 600 may include a resource list 610, a resource 602, a backup status 612, and backup-status information 622. In this example, backup status 612 (e.g., a box with a "X" icon) associated with resource 602 indicates that at least one backup of resource 602 failed.

In the above example, a user may interact with backup status 612 (e.g., by selecting, clicking on, hovering over, etc.) to request additional backup-status information for resource 602. In response to the request, interface module 108 may display backup-status information 622 to the user (e.g., as a popup window). As shown in FIG. 6, backup-status information 622 may indicate that one backup of resource 602 (e.g., "Symcdemovm1.local Backup 00003-Incremental") failed and one backup of resource 602 (e.g., "Symcdemovm1.local Backup 00003-Incremental") succeeded with exceptions. In this example, the user may select or click on the word "RETRY" next to either of these backups to attempt to retry one of the backups.

As explained above, by displaying visual backup status indicators within a graphical user interface, the systems and methods described herein may allow a user to quickly determine if backups of computing resources have succeeded or failed during a recent period of time without the need to sift through individual backup statuses. Furthermore, in some examples, by providing additional backup status information, these systems and methods may also allow a user to easily access information needed to troubleshoot backup failures.

Figure 7:
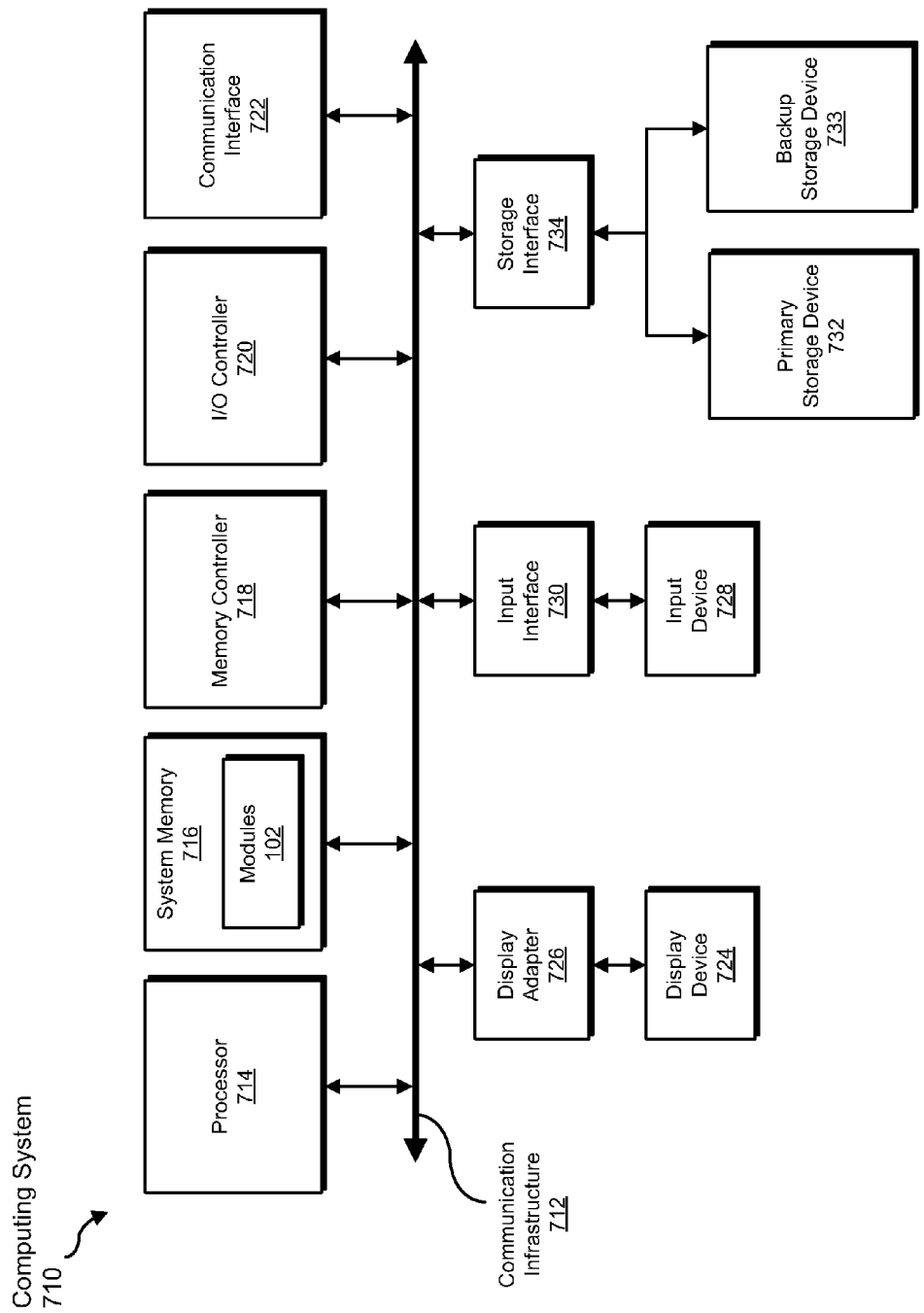
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the displaying, indentifying, determining, using, and/or allowing steps described herein. All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be separate devices accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
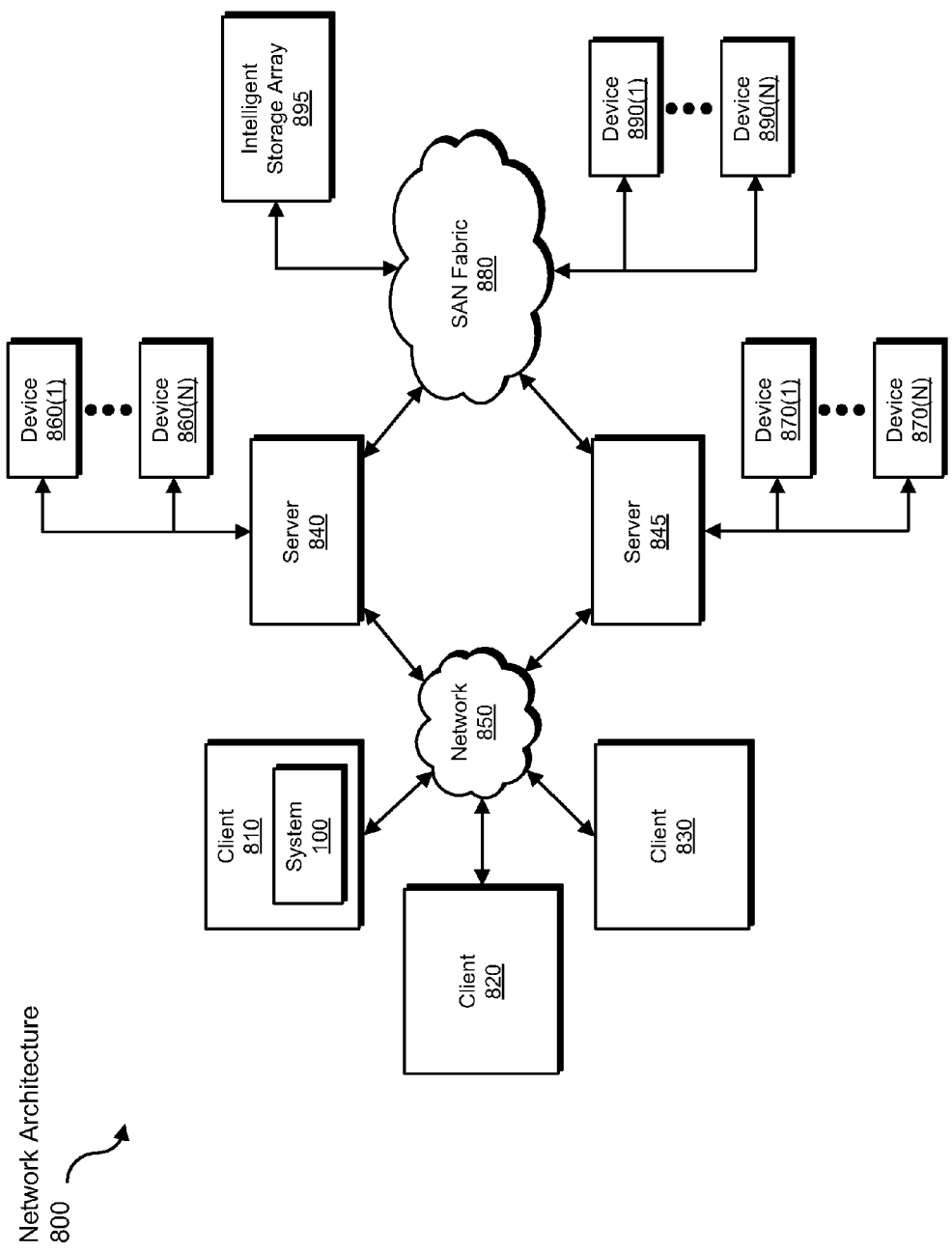
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the displaying, indentifying, determining, using, and/or allowing steps disclosed herein. All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and intelligent storage array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for displaying backup-status information for computing resources.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system capable of displaying backup-status information for computing resources.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for displaying backup-status information for computing resources, at least a portion of the method being performed by a computing device comprising at least one processor, the method comprising:
   identifying at least one protected resource that is scheduled to be backed up periodically;
   identifying a request to view backup-status information for the protected resource;
   in response to the request:
   identifying each backup of the protected resource that was scheduled to occur during a prior window of time;
   determining whether each scheduled backup of the protected resource was successful;
   displaying, within a graphical user interface, a single visual backup status indicator for the protected resource for the prior window of time that indicates whether all backups of the protected resource that were scheduled to occur during the prior window of time were successful.

2. The method of claim 1, wherein the single visual backup status indicator for the protected resource for the prior window of time visually indicates whether any scheduled backups of the protected resource failed during the prior window of time without displaying an individual backup status for each backup of the protected resource that was scheduled to occur during the prior window of time.

3. The method of claim 1, wherein the single visual backup status indicator visually indicates at least one of:
   that each scheduled backup of the protected resource was successful;
   that at least one scheduled backup of the protected resource failed;
   that at least one scheduled backup of the protected resource succeeded with exceptions;
   that there was no backup scheduled to occur during the prior window of time.

4. The method of claim 1, wherein the single visual backup status indicator for the protected resource visually indicates whether all backups of the protected resource that were scheduled to occur during the prior window of time were successful using at least one of:
   at least one color;
   at least one symbol.

5. The method of claim 1, wherein:
   the prior window of time comprises a plurality of time periods;
   identifying each backup of the protected resource that was scheduled to occur during the prior window of time comprises identifying each backup of the protected resource that was scheduled to occur during each of the plurality of time periods;
   displaying the single visual backup status indicator for the protected resource for the prior window of time comprises displaying, within the graphical user interface, a single visual backup status indicator for the protected resource for each of the plurality of time periods.

6. The method of claim 5, wherein the plurality of time periods comprise two or more consecutive time periods, and the two or more consecutive time periods include a current time period.

7. The method of claim 1, further comprising allowing a user to access additional backup-status information of the protected resource for the prior window of time via the graphical user interface.

8. The method of claim 7, wherein the additional backup-status information comprises at least one of:
   an individual backup status for at least one scheduled backup of the protected resource, wherein the individual backup status identifies whether the scheduled backup of the protected resource was successful;
   a backup log for the scheduled backup of the protected resource, wherein the backup log provides a description of the scheduled backup of the protected resource.

9. The method of claim 1, further comprising allowing a user to restart at least one scheduled backup of the protected resource via the graphical user interface.

10. The method of claim 1, wherein displaying the single visual backup status indicator for the protected resource for the prior window of time comprises:
    displaying, within the graphical user interface, a list of protected resources comprising the protected resource;
    displaying, within the list of protected resources, the single visual backup status indicator for the protected resource for the prior window of time.

11. The method of claim 1, wherein the single visual backup status indicator for the protected resource for the prior window of time provides a single visual summary of whether all backups of the protected resource that were scheduled to occur during the prior window of time were successful.

12. A system for displaying backup-status information for computing resources, the system comprising:
    an identification module programmed to:
    identify at least one protected resource that is scheduled to be backed up periodically;
    identify a request to view backup-status information for the protected resource;

a determination module programmed to, in response to the request:
  identify each backup of the protected resource that was scheduled to occur during a prior window of time;
  determine whether each scheduled backup of the protected resource was successful;
an interface module programmed to display, within a graphical user interface, a single visual backup status indicator for the protected resource for the prior window of time that indicates whether all backups of the protected resource that were scheduled to occur during the prior window of time were successful;
at least one processor configured to execute the identification module, the determination module, and the interface module.

13. The system of claim 12, wherein the single visual backup status indicator for the protected resource for the prior window of time is displayed without displaying an individual backup status for each backup of the protected resource that was scheduled to occur during the prior window of time.

14. The system of claim 12, wherein the single visual backup status indicator visually indicates at least one of:
  that each scheduled backup of the protected resource was successful;
  that at least one scheduled backup of the protected resource failed;
  that at least one scheduled backup of the protected resource succeeded with exceptions;
  that there was no backup scheduled to occur during the prior window of time.

15. The system of claim 12, wherein the single visual backup status indicator for the protected resource visually indicates whether any scheduled backups of the protected resource failed during the prior window of time using at least one of:
  at least one color;
  at least one symbol.

16. The system of claim 12, wherein:
  the prior window of time comprises a plurality of time periods;
  the identification module identifies each backup of the protected resource that was scheduled to occur during the prior window of time by identifying each backup of the protected resource that was scheduled to occur during each of the plurality of time periods;
  the interface module displays the single visual backup status indicator for the protected resource for the prior window of time by displaying, within the graphical user interface, a single visual backup status indicator for the protected resource for each of the plurality of time periods.

17. The system of claim 16, wherein the plurality of time periods comprise two or more consecutive time periods, and the two or more consecutive time periods includes a current time period.

18. The system of claim 12, wherein the interface module is further programmed to allow a user to access additional backup-status information of the protected resource for the prior window of time via the graphical user interface.

19. The system of claim 18, wherein the additional backup-status information comprises at least one of:
  an individual backup status for at least one scheduled backup of the protected resource, wherein the individual backup status identifies whether the scheduled backup of the protected resource was successful;
  a backup log for the scheduled backup of the protected resource, wherein the backup log provides a description of the scheduled backup of the protected resource.

20. A non-transitory computer-readable-storage medium comprising one or more computer-executable instructions that, when executed by at least one processor of a computing device, cause the computing device to:
  identify at least one protected resource that is scheduled to be backed up periodically;
  identify a request to view backup-status information for the protected resource;
  in response to the request:
  identify each backup of the protected resource that was scheduled to occur during a prior window of time;
  determine whether each scheduled backup of the protected resource was successful;
  display, within a graphical user interface, a single visual backup status indicator for the protected resource for the prior window of time that indicates whether all backups of the protected resource that were scheduled to occur during the prior window of time were successful.

* * * * *